(No Model.) 4 Sheets—Sheet 1.
A. R. UPWARD & C. W. PRIDHAM.
GALVANIC BATTERY AND APPARATUS CONNECTED THEREWITH.
No. 357,646. Patented Feb. 15, 1887.
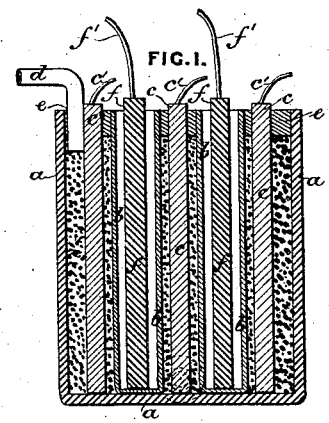
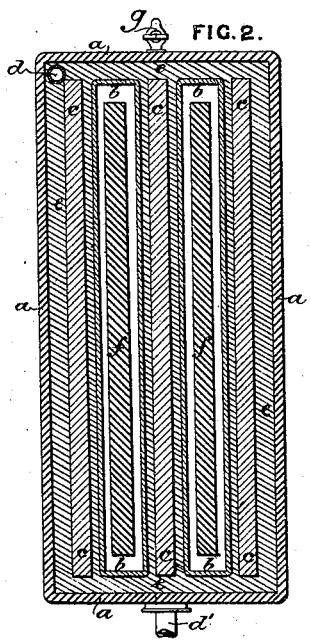

(No Model.) 4 Sheets—Sheet 2.

A. R. UPWARD & C. W. PRIDHAM.
GALVANIC BATTERY AND APPARATUS CONNECTED THEREWITH.

No. 357,646. Patented Feb. 15, 1887.

(No Model.) 4 Sheets—Sheet 3.

A. R. UPWARD & C. W. PRIDHAM.
GALVANIC BATTERY AND APPARATUS CONNECTED THEREWITH.

No. 357,646. Patented Feb. 15, 1887.

(No Model.) 4 Sheets—Sheet 4.

A. R. UPWARD & C. W. PRIDHAM.
GALVANIC BATTERY AND APPARATUS CONNECTED THEREWITH.

No. 357,646. Patented Feb. 15, 1887.

United States Patent Office.

ALFRED RÉNÉ UPWARD, OF WEST KENSINGTON, AND CHARLES WILLIAM PRIDHAM, OF KENSINGTON, COUNTY OF MIDDLESEX, ENGLAND.

GALVANIC BATTERY AND APPARATUS CONNECTED THEREWITH.

SPECIFICATION forming part of Letters Patent No. 357,646, dated February 15, 1887.

Application filed October 12, 1885. Serial No. 179,689. (No model.) Patented in England November 26, 1884, No. 15,567, June 18, 1885, No. 7,461, and August 4, 1885, No. 9,302; in France March 2, 1885, No. 174,503; in Spain August 31, 1886, No. 9,290, and in Belgium October 6, 1886, No. 74,745.

*To all whom it may concern:*

Be it known that we, ALFRED RÉNÉ UPWARD, electrical engineer, of No. 10 Talgarth Road, West Kensington, and CHARLES WILLIAM PRIDHAM, physician, of No. 10 Cromwell Crescent, Kensington, both in the county of Middlesex, England, subjects of the Queen of Great Britain, have invented certain new and useful Improvements in Galvanic Batteries and in Apparatus Connected Therewith, of which the following is a specification, and for which we have obtained Letters Patent in Great Britain, No. 15,567, dated November 26, 1884, No. 7,461 dated June 18, 1885, and No. 9,302, dated August 4, 1885; in France, No. 174,503, dated March 2, 1885; in Spain, No. 9,290, dated August 31, 1886, and in Belgium, No. 74,745, dated October 6, 1886.

This invention has for its object improvements in galvanic batteries and in apparatus connected therewith.

The improved battery is maintained in an active condition by the passage of chlorine gas into the cells. The gas is supplied from a gas-holder of a special sort, and it is drawn through the battery by suction. The passage of the gas is controlled by an electric governor. Such a battery will be found very constant and of great electro-motive force.

Figure 3:
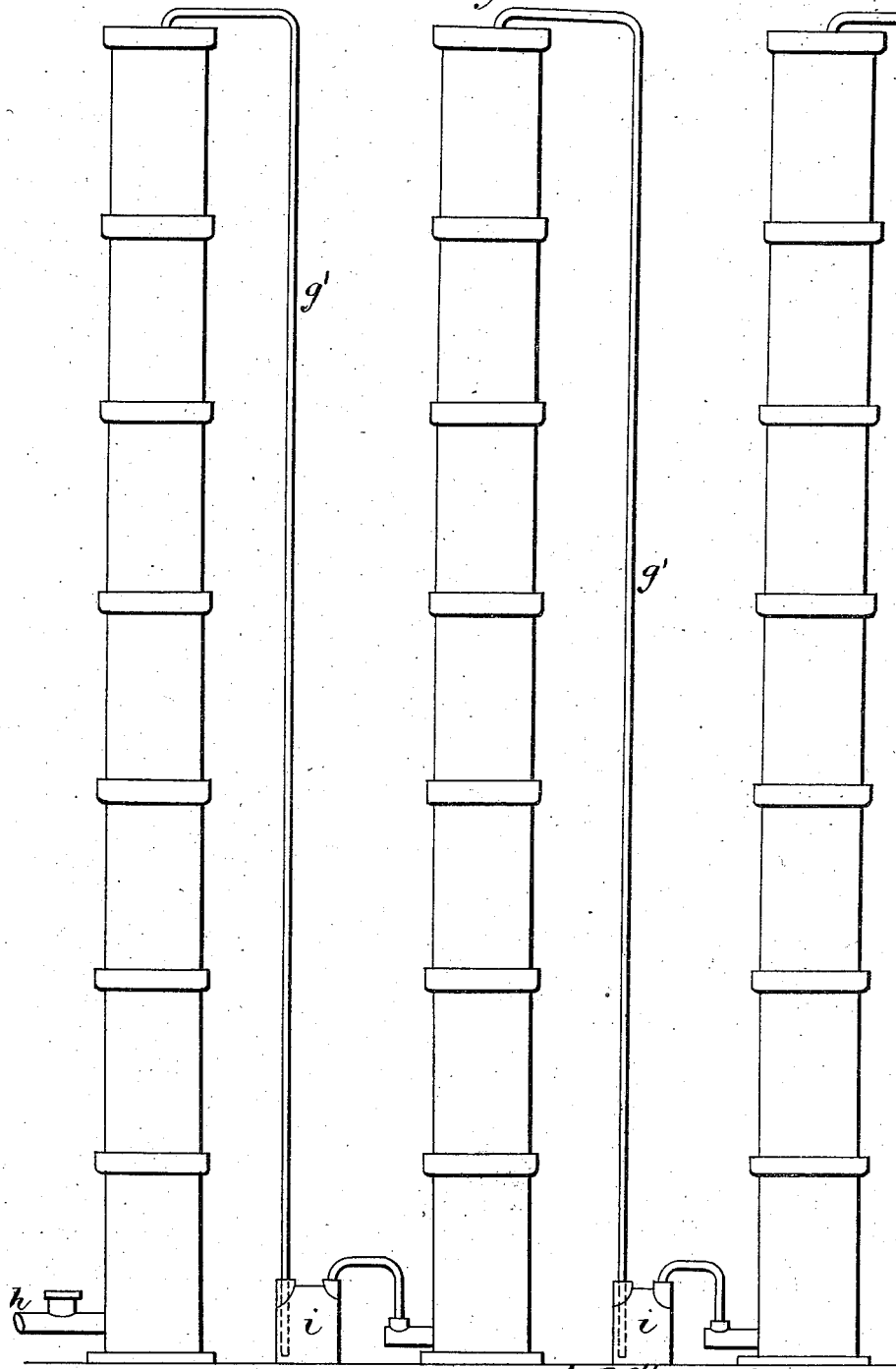
Figure 4:
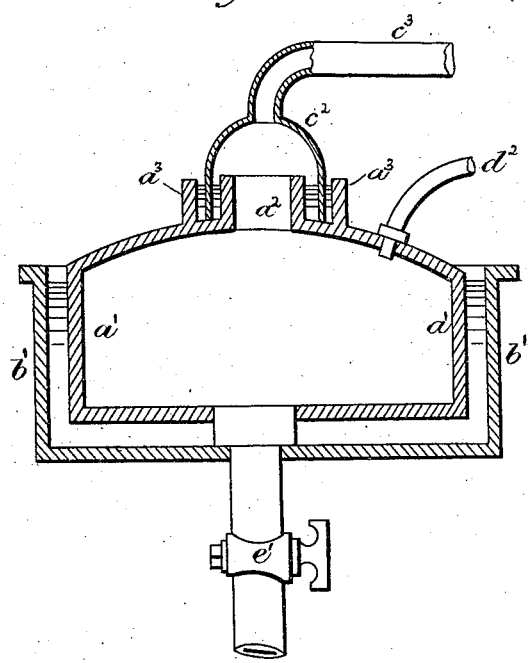
Figure 5:
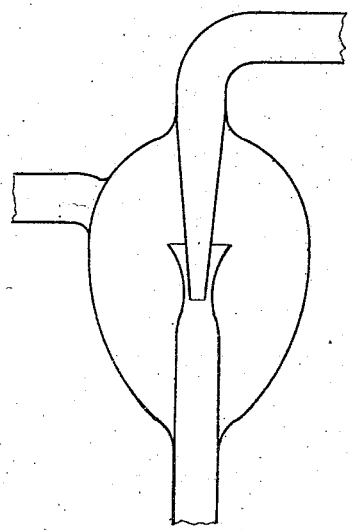

In the annexed drawings, Figure 1 is a vertical section, and Fig. 2 is a transverse section, of a battery-cell constructed in accordance with our invention. Fig. 3 is an elevation of a gas holder or receiver. Fig. 4 is a vertical section of a chlorine-generator; Fig. 5, a vertical section of an aspirator, and Fig. 6 a diagram of electrical governing apparatus.

$a$ is the outer cell or vessel. It may be of glazed earthenware.

$b$ $b$ are inner cells of unglazed earthenware.

$c$ $c$ $c$ are three carbon slabs, which are placed in the outer vessel, one on either side of each of the porous cells $b$ $b$. The remaining space between the vessels $a$ and $b$ is then packed with carbon broken to a size to pass through a sieve with six holes to the linear inch. This carbon, which should be free from dust, is thoroughly moistened before it is put into its place; but any surplus liquid is drained off from the cell, so as to leave it free for the circulation of the gas.

Near the bottom of the cell is a socket, $d'$, to receive a lead pipe to lead the gas into the cell. A glass tube, $d$, is also provided for the exit of the gas.

$e$ represents cement, which is now applied to seal the top of the vessel $a$ and to close the space between the upper edges of the vessels $a$ and $b$. The cement which I prefer to employ consists of a mixture of equal parts of marine glue and pitch. The melted composition is poured into the cell which it is required to seal. The surfaces to which the cement is required to adhere should be quite dry and rough. The joint is finished by carefully remelting the surface of the cement with a blowpipe flame or in other convenient manner. The vessels $b$ $b$ are left open at the top, and each receives a zinc element, $f$. When the battery is at work, the cells $b$ are filled with liquid around the zinc element. Water may be employed; but a solution of chloride of zinc or of common salt is preferred.

In place of zinc as the anode, we may employ another metal—as, for example, iron.

$c'$ $c'$ $c'$ and $f'$ $f'$ are wires or conductors by which the current is taken off. They may be connected with the elements in any convenient manner. Usually I cast the zinc $f$ upon a wire which has previously been galvanized or tinned, and I make the connections with the carbons by depositing copper upon them and then soldering the conductor to the metal so deposited, or by casting a leaden cap on the end of the carbon.

$g$ is a stop-cock to draw off any liquid which may accumulate in the cell $a$. In consequence of the chloride-of-zinc solution finding its way through the sides of the porous cell $b$, this liquid should be removed when it rises above the stop-cock $g$. A convenient way to do this automatically is to allow the nose of the cock to dip down into a trough or vessel filled with the liquid. The cell $a$ will then be automatically voided of liquid, while the gas cannot escape. The stop-cock $g$ then need never be closed. Chloride of zinc being highly hydroscopic, the carbon element will always remain moistened with its solution, although the liquid never stands in the cell above the level of the stop-cock $g$. The solution in the cells $b$ around the zinc should be kept between the specific gravity 1.2 and 1.4. If it tends to get stronger, as may sometimes happen, some of the solution should be removed from the open cells $b$ and water added in its place.

The cells are coupled together in the usual way to form a battery with any required number of elements.

The sockets $d'$ and the tubes $d$ of the several cells are also connected together by lead pipes. The ends of the glass tubes are made taper, and are inserted into the coned ends of the leaden pipes. The joint is made tight with marine glue. In the same way a tight joint is made around the pipe in the socket $d'$; or the connections may be made by other convenient appliances. These connections may be so made that gas admitted at one end of the battery may travel continuously forward from cell to cell until it reaches the other end of the battery; or, if the cells be numerous, the connections may be so made that gas may enter the battery at several different points. The chlorine gas for use in the battery may be prepared in any convenient way, and it may be stored in a compressed state. The gas for immediate use is drawn from a gas-holder, which consists of a column of a capacity slightly in excess of the quantity of gas it is desired to store. It should be lofty, say twenty feet or more in height, according to the scale on which the apparatus is constructed. The column may be of any material which is not liable to be destroyed by the gas. Well-glazed drain-pipes built up with marine glue between the flanges are suitable. In some cases the column may be filled with broken fragments of carbon or pebbles; or more or less divided by partitions, to prevent admixture with air.

The column has a cover at the top, which is fitted with a long exit-tube of small diameter, by which means the column can be filled nearly to the top without much loss of gas.

The inlet for the gas from the generator or other source of supply is near the bottom, and so also is the outlet by which the gas passes to the battery or batteries. One such store-vessel may be employed to supply a number of batteries. Chlorine gas being considerably heavier than air remains at the bottom of the gas-holder and mixes but little with the air, and such admixture as occurs is in no way detrimental to the action of the batteries to which the gas is supplied.

Sometimes we employ several gas-receiving columns connected in series, as is indicated in Fig. 3. There three columns are shown; but as many as six may advantageously be employed, each consisting, say, of seven earthenware pipes nine inches in diameter and twenty-four inches long. They are well glazed on the inside and are put together with gas-tight joints made with pitch and marine glue, or it may be with Portland cement. Each column is furnished at the top with a descending pipe, $g'$, serving to connect one column with another. The last column of the series may be, however, entirely open at the top. In any case there is a passage by which air can enter or escape freely.

$h$ is the pipe by which the gas arrives at the receiver, and a branch from the same pipe passes to the cells to feed them as they require. The pipes $g'$ connect the top of one column to the bottom of the next throughout the series. In the course of these pipes glass vessels $i$, whitened at the back, are introduced, in which the charge of gas can be seen, the color of the gas rendering it clearly visible. Thus when the first column is full the gas is seen in the vessel $i$ flowing from the first to the second column, and so on, as each column fills. When the fifth column is full it is time to lessen the production of gas by cooling the generator. Similarly, when the production of gas is proceeding slowly, or is intermitted, the progressive emptying of the columns can be observed in the vessels $i$, the color disappearing progressively as an inflow of air at the far end of the series sweeps the chlorine before it from column to column toward the battery-cells. We interpose, also, a glass vessel similar to $i$ between the generator and the first column; but in this vessel we place a little water, and the pipe from the generator just dips into this water. The object in this case is that the bubbling of the gas through the water may indicate the activity of the generator.

In working the apparatus it is often convenient to employ a weighted charge in the generator, so proportioned to the capacity of the receiver that it will fill it without waste.

For the generation of the chlorine gas, it is convenient to employ a retort immersed in a water-bath. The retort is charged, as usual, with common salt, oxide of manganese, and sulphuric acid. The liberation of the gas is promoted by heating the water-bath to the boiling-point by a gas-flame beneath, or otherwise.

The generator represented by Fig. 4 of the drawings consists of a stoneware vessel, $a'$. It is to be set within an exterior vessel, $b'$, containing water, which is kept heated while the generator is at work.

$a^2$ is an aperture at the top of the vessel for introducing the charge of oxide of manganese and muriatic acid in the usual proportions.

$a^3$ is a water-trap around the aperture $a^2$.

$c^2$ is a movable leaden dome, and $c^3$ is a pipe connected with the dome, by which the gas is led away to the receiver. When the dome is in place its edges dip into the water in the trap $a^3$.

$d^2$ is a water-pipe connected with the vessel $a'$. It is intended to supply water to wash away the residue when the charge is expended, so that it may be got rid of without lifting the vessel $a'$ from its place, which would be troublesome on account of the weight of the vessel, and also without lifting the dome $c^2$ before the vessel is empty, as inconvenience would in that case result from escape of gas.

In the use of this generator the heat of the water bath causes the gas to be liberated more or less rapidly, according to the temperature maintained, and the gas passes off until in some hours the charge is expended.

The apparatus is cleared out ready to receive another charge by opening the cock $e'$, connected with an opening in the bottom of the vessel $a'$, and with a drain the residue is then run off without smell, and the vessel $a'$ is afterward completely cleared by opening the water-tap $d^2$. The gas passing off by the pipe $c^3$ is taken to the gas-receiver.

In place of charging the vessel $b'$ with water, sand or other slow conductor of heat may be employed.

At the outlet from each battery we provide a suction apparatus or aspirator. Such an apparatus as is employed in chemical laboratories to facilitate filtration, and in which air is withdrawn by the operation of water descending a pipe under the influence of a head and of gravity, is suitable.

The aspirator shown by Fig. 5 is of well-known construction and in common use in chemical laboratories. It consists of a glass pipe of, say, three-eighths of an inch internal diameter and drawn out to a tapering end with, say, one-eighth of an inch aperture or less. Water from a main or cistern is supplied to it and issues in a jet. The water-jet is delivered into the mouth of another pipe, which it descends vertically for some distance. The mouth of the latter pipe receives the drawn-out extremity of the jet-pipe, leaving a narrow annular passage all around. The descending pipe is tapered from the upper end downward for a short distance, and below the tapering part it may be of the same diameter as the pipe connected with the water-main. The jet and the receiving-mouth are within an egg-shaped inclosure of glass, and with this the battery-cells are connected. The descending pipe is usually bent at its lower end with two right-angle bends, which break the descent of the water. The gas thus drawn into the battery-cells operates in the following manner: The zinc plate is immersed in a solution of some chloride, (such as sodium-chloride or common salt,) which may of course be used over and over again, and the carbon is surrounded by free chlorine gas. Now, when the circuit is closed the chlorine of the chloride of sodium is free to act on the zinc or anode, on account of the free chlorine surrounding the carbon or cathode. The electro-motive force of this cell is high, on account of chlorine being an elementary substance.

By arranging cells according to the details given the great disadvantage of having chlorine acting on the zinc with generation of waste heat is entirely avoided.

We maintain the current from each battery constant while the battery is in use by providing an electric governor in the circuit—an electric governor such as is usual with steam-engines driving dynamos to control the supply of steam, and consequently the speed of the engine in accordance with the current passing in the circuit or of the difference of potential between the parts of this circuit, is suitable. The governor, in place of controlling a steam-valve, as when a steam-engine is governed, controls the water-valve of the suction apparatus, and so increases or diminishes the flow of gas through the battery-cells in such manner as to maintain a constant current in the circuit or a constant difference of potential between parts thereof.

Figure 6:
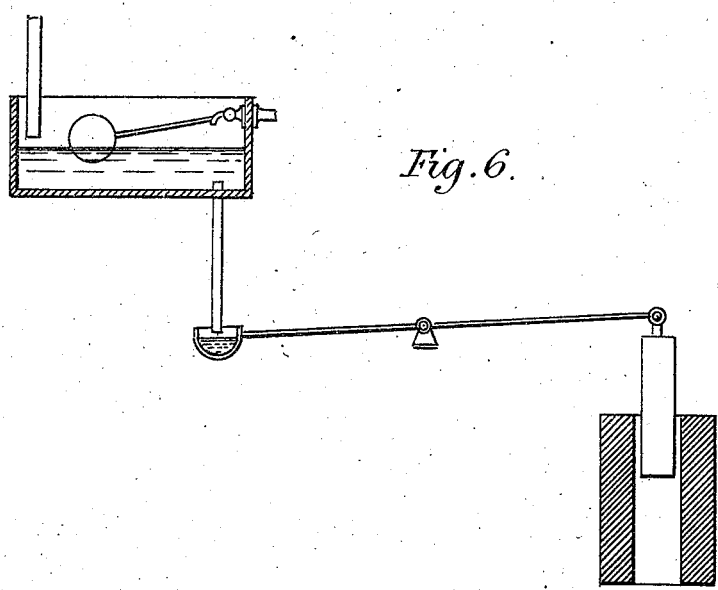

As is indicated in Fig. 6, beneath the lower end of the descending pipe of the aspirator we place a small cistern in which is a float. There is an outlet near the bottom of the cistern, and it is connected with a pipe which dips down into a mercury-cup. The mercury-cup is supported on one end of a scale-beam, and at the other end of the scale-beam the core of a solenoid hangs suspended within a solenoid-coil. When no current is passing, the weight of the mercury-cup preponderates and the outlet from the cistern remains open. When the current from the battery passes through the coil, and when the flow is sufficient, the core is drawn down and the mercury-cup is raised, closing the outlet-pipe, and water is retained in the cistern. The float then rises. It moves the water-tap and cuts off the supply to the aspirator, leaving only a very small flow. Little or no chlorine gas is then drawn from the receiver, and the electric current soon commences to decrease. The mercury-cup then again falls away, the outflow from the cistern recommences, and the float descending sets the aspirator again to work.

The aspirator described will be found suitable for a series of, say, twenty cells of two gallons capacity, this series being connected at one end with the gas-receiver and at the other end with the aspirator. The solenoid and core and other parts of the electric governor are so adjusted as to permit the escape of water from the cistern somewhat before the battery comes up to its maximum, and then no gas is drawn to waste from the end of the series of battery-cells. The aspirator and governor should be fixed solidly against a wall.

In cells of large size with broad passages, gravity and the suction of the cell itself may be depended on to cause the chlorine gas to descend from the gas-receiver to supply the place of that which enters into combination with the zinc; or the valve controlled by the governor may be a valve admitting air to the battery-cells to mingle with the chlorine gas. In this case, the suction being constant and the current through the cells constant, or nearly so, it will be more or less rich in chlorine, according to the position in which the air-admission valve is placed by the governor. The operation of the battery will be controlled and moderated accordingly. The air employed for this purpose may be drawn from the upper part of the gas-holder, and if this air has become to some extent impregnated with chlorine the gas will so be turned to account and waste avoided.

We are aware of English Patents No. 2003 of 1853, and No. 108 of 1883, and of United States Patent to Cheever, No. 233,601, of October 26, 1880. We do not, therefore, claim anything shown in these patents.

What we claim is—

1. A battery in which the carbon elements are contained in compartments which are kept void of liquid and filled with free uncombined chlorine gas.

2. A battery-cell in which a zinc element is immersed in a solution of a soluble chloride separated by a porous diaphragm from a compartment kept void of liquid but filled with free uncombined gaseous chlorine.

3. In a galvanic battery, the combination of the outer casing, the positive and negative elements, the granulated filling, the cement covering the top of the filling, and the inlet and outlet openings in the casing, and the free uncombined chlorine gas that passes through the granulated filling which surrounds the carbon element.

4. The combination of a chlorine battery with suction apparatus by which the gas is drawn forward through the battery-cells.

5. The combination of a chlorine battery, an electric governor, and a suction apparatus, the said governor controlling the quantity of gas drawn into the battery-cells by the suction apparatus.

6. The combination, with the cells of a gas-battery, of an open gas receiver or reservoir of relatively great height or length, supplying chlorine into the cells by suction, whether the suction be artificial or resulting from the absorption of the gas within the cells.

ALFRED RÉNÉ UPWARD.
CHARLES WILLIAM PRIDHAM.

Witnesses:
JNO. DEAN,
THOMAS LAKE,
   *Both of 17 Gracechurch St., London.*